UNITED STATES PATENT OFFICE 2,618,649

PRODUCTION OF ESTERS OF PRODUCTS FROM OXO SYNTHESIS

Thomas H. van Bavel, Han Hoog, and Pieter W. O. Wijga, Amsterdam, Netherlands, assignors to Shell Development Company, San Francisco, Calif., a corporation of Delaware No Drawing. Application April 12, 1949, Serial No. 87,128. In the Netherlands May 4, 1948

7 Claims. (Cl. 260—459)

This invention relates to surface-active esters of inorganic acids and deals particularly with novel esters of phosphorus and sulfur oxy-acids and their salts which are particularly valuable as wetting agents, emulsifiers, detergents, and the like. The invention also deals with a new method for producing these novel compounds from products of the "Oxo-synthesis."

It is known that by treating unsaturated hydrocarbons such as alkenes with mixtures of carbon monoxide and hydrogen at elevated temperature and pressure in the presence of suitable catalysts, particularly cobalt catalysts, followed by hydrogenation of the resultant mixture of aldehydes, mixtures of primary alcohols, which contain one more carbon atom than the unsaturated hydrocarbons used as initial materials, are obtained. In this process, known as "Oxo-synthesis," more or less appreciable quantities of higher molecular polymerization and condensation products are always formed in addition to the above-mentioned oxo-alcohols. These high molecular by-products must be attributed to side reactions occurring during the first stage, i. e. the formylation reaction. Among the side reactions which lead to the formation of these products, aldolization and crotonization reactions occurring between the primarily formed aldehydes, as well as intermolecular esterifications of the aldehydes, probably play an important part. These higher molecular products, which will be referred to hereinafter as "thick oils," consist of fairly complex mixtures of organic compounds of different type. Thus, for instance, the thick oil which is obtained in the production of oxo-alcohols with $n+1$ carbon atoms, starting from alkenes having $n$ carbon atoms per molecule, comprises a considerable proportion of compounds having $2n+2$ carbon atoms per molecule together with lesser amounts of higher molecular products, predominantly compounds having three or four times as many carbon atoms as the oxo-alcohols and apparently resulting from prolonged condensation or polymerization in the formylation stage.

It has now been found that the thick oils referred to above, which have heretofore been generally considered as undesirable by-products whose production should be minimized in the preparation of oxo-alcohols, constitute a very suitable starting material for the manufacture of surface-active salts of acid esters of oxy-acids of phosphorus and sulfur, especially sulfation and phosphation products having unusually desirable properties. This is quite unexpected in view of the character of the components which it has been possible to identify in these thick oils. Thus, it has been found that the thick oils contain among other possible compounds a considerable proportion of branched primary dimeric alcohols with an almost central carbinol group and branched 1,3-diols, which alcohols and diols on an average contain $2n+2$ carbon atoms per molecule and esters of the monomeric oxo-alcohols, as well as esters of the 1,3-diols. A typical thick oil from an oxo-synthesis using hexene-1 as the starting olefin has, for instance, the following analysis:

| | Per cent |
|---|---|
| $C_7$ alcohols | None |
| $C_{14}$ esters | 8–9 |
| $C_{14}$ branched chain alcohols | 16–17 |
| $C_{14}$ 1,3-diols | 26–32 |
| $C_{21-28}$ diol esters | 38–42 |
| Non-saponifiable high molecular products | 6–8 |

As another example, a thick oil from an oxo-synthesis with octene-1 contained 8–12% of $C_{18}$ esters, 16–20% of $C_{18}$ branched chain alcohols, and 68–74% of $C_{18}$ diols, diol esters and higher boiling components. It was surprising to find that such unpromising complex starting mixtures could be converted into esters of oxy-acids of phosphorus and sulfur and salts thereof having exceptionally advantageous surface-active properties.

According to the invention these new surface-active products are produced by separating a thick oil or a selected fraction or fractions thereof from the oxo-alcohols produced therewith, reacting the separated thick oil or fraction thereof with an oxy-acid of phosphorus or sulfur, and neutralizing the resulting reaction product with a suitable base. If so desired, the organic acid esters contained in the thick oil may be removed wholly or partially prior to the reaction with the chosen oxy-acid of phosphorus or sulfur, although it is often advantageous to treat the organic ester-containing thick oils since the organic esters appear to contribute desirable properties to the final product. It has been found that the organic esters in the thick oil may be advantageously removed therefrom, when such removal is desirable, by subjecting the thick oil or selected thick oil fraction to catalytic destructive hydrogenation, causing the esters present to be split with the resultant formation of branched primary dimeric alcohols and monomeric oxo-alcohols. Preferably, the monomeric oxo-alcohols are distilled from the hydrogenation product at least partially prior to reaction with the inorganic phosphorus or sulfur oxy-acid. This destructive hydrogenation, which is carried out in the presence of an active hydrogenation catalyst, preferably a catalyst containing copper chromite such as the so-called Adkins catalyst, calls for much higher temperatures and hydrogen pressures than are required for the hydrogenation of the aldehyde mixture formed in the formylation process. Generally, this destructive hydrogenation is carried out at temperatures of 200° C.–300° C. and hydrogen pressures of 200–300 atm. The hydrogenation product, preferably freed from the monomeric alcohols and now comprising a substantial proportion of branched primary dimeric alcohols and diols, can be sulfated entirely or one or more relatively narrow fractions can be separated by fractional distillation, which fractions are then converted separately into the desired inorganic acid ester products.

The thick oils used as starting materials in the process according to the invention may be derived from the formylation of any olefinic hydrocarbon, for instance, alkenes such as propene, n-butenes, isobutene, normal or branched pentenes, hexenes, heptenes, octenes, nonenes, decenes, etc., or mixtures of two or more alkenes, or hydrocarbon mixtures predominantly consisting of one or more alkenes such as cracked gasoline or other products of cracking or dehydrogenation of petroleum. Olefin polymers, e. g. diisobutylene, etc., may also be used, as well as cyclohexene, butadiene, isoprene, polymerized dienes, styrene, alpha-methyl styrene, vinyl cyclohexene, pinene, limonene, cyclohexadiene, dicyclopentadiene, etc.

Preferably applied thick oils are those obtained in the oxo-synthesis in which alkenes with 6 to 8 carbon atoms are used as starting materials, such as 1-hexene, 1-heptene, 1-octene, diisobutene, etc., since it has been found that in general products with the best surface-active properties can be obtained thereby.

As previously indicated, the thick oils used as starting materials in the process of the invention are by-products whose production is minimized in the usual operation of the oxo-synthesis because they are regarded as undesirable. However, it is a feature of the present invention in one of its more specific modifications to provide a combination process comprising the production of the thick oils in increased yields, preferably as the major product of the oxo-synthesis, and sulfation of the resulting desirable thick oils whereby improved yields of surface-active agents may be obtained. A number of different methods of modifying the oxo-synthesis to improve the yield of thick oil, and, consequently, of sulfation products are possible. One may, for instance, increase the time of reaction in the formylation stage and/or alter the olefin to water gas ratio, pressure or other conditions to favor polymerization and condensation of the initially formed aldehydes. However, it is preferred as a general rule to increase the thick oil production by subjecting the product of the formylation step, in the presence or absence of the oxo-catalyst but after removal of carbon monoxide therefrom, to a heat treatment before carrying out the hydrogenation step. For instance, the effluent of the formylation reactor may be cooled, say to about 30° C. to 80° C., and the gases, mainly carbon monoxide and hydrogen, separated and recycled to the formylation reaction while the liquid products are heated at about 120° C. to 250° C., preferably about 180° C. to 200° C., for a time usually about 30 minutes to 3 hours whereby the proportion of higher boiling product is increased, and the product, with or without another cooling and gas separation treatment, is then subjected to hydrogenation as previously described. Most preferably, the heating step carried out before hydrogenation is effected under pressure; for instance, a hydrogen pressure of the order of about 10 to 50 atmospheres during heating is advantageous. In this way the yield of desirable thick oils for use according to the invention may be substantially increased and, indeed, the thick oil may be made the predominant product of the thus modified oxo-synthesis.

Another feasible method of increasing the yield of thick oils suitable for reaction according to the invention is to fractionate the products of the formylation step to separate the desired higher boiling products from those of lower boiling range, i. e. the products having one more carbon atom than the starting olefin, and recycling these wholly or in part to the formylation reactor for conversion therein to higher boiling products giving the desired thick oils on subsequent hydrogenation. Alternatively, such a fractionation may be carried out after subjecting the product from the formylation reactor to the heat treatment previously referred to, in which case the lower boiling products separated may be recycled either to the formylation reactor or to the heat treatment, or to both. Where it is desirable to produce oxo-alcohols as well as thick oils for conversion to surface-active agents in accordance with the invention, only a part of the lower boiling formylation products may be thus recycled.

Whether produced by one of the foregoing modifications or as a by-product of the conventional oxo-synthesis, or another suitable method, the thick oil is reacted with an inorganic oxy-acid of phosphorus or sulfur. Suitable acids are, for example, sulfuric, pyrosulfuric, chlorosulfonic, phosphoric, pyrophosphoric, and like acids, or oleum, etc. The concentration in which the acid is used will vary depending upon the temperature and time of reaction, and the particular acid and thick oil used. Sulfuric or phosphoric acid is preferably used at a concentration of at least 85%, more preferably 95% or more. With strong oxy-acids of sulfur such as sulfuric acid, oleum, chlorsulfonic acid, etc., it is usually desirable to use low temperatures, of the order of 10° C. to 50° C., for instance. Higher temperatures are usually necessary with phosphoric acid and the like but, as a general rule, temperatures of 100° C. or lower are preferred. As a rule, relatively short reaction times are preferable, times of the order of about 5 to 30 minutes, for example, being suitable. The reaction of the thick oil or chosen fraction thereof with the oxy-acid of phosphorus or sulfur may be carried out in the presence of an inert solvent or diluent using preferably an excess of the acid over the theoretical amount required to esterify the hydroxyl groups present and produce acid esters.

After reaction with the chosen oxy-acid of phosphorus or sulfur, or with a mixture of two or more such acids, the products consisting entirely or substantially of organic acid esters of said inorganic oxy-acids are converted into salts by neutralizing them with inorganic or organic basic-reacting substances. Before neutralization it is often advantageous to remove any excess unreacted oxy-acid which may be present. The excess acid may advantageously be removed by extraction with small amounts of water as described in U. S. Patent 2,078,516, or by treatment as described in U. S. Patent 2,155,027. Suitable basic-acting compounds which may be used for neutralization include, for example, alkali metal hydroxides, particularly sodium and potassium hydroxides, alkali metal carbonates, for instance, sodium bicarbonate or sodium carbonate, and alkaline earth metal bases such as magnesium or calcium oxides or hydroxides. Ammonia or amino compounds, of which morpholene, the alkyl amines such as mono-, di- and tri-methyl amines, alkylolamines such as the ethanolamines, etc. are typical, may likewise be used.

It has been found that the surface-active substances contained in the neutralized mixture can be extracted in more or less concentrated form with suitable solvents, such as ether.

Dependent on the initial material used in the process according to the invention, the final neutral products have a viscous, paste-like or waxy consistency. Contrary to most of the secondary sulfuric acid ester salts obtained from alkenes, which are not or only slightly soluble in hydrocarbons, these products are generally not only soluble in water but also in hydrocarbons, for instance, gasoline and oil.

The surface-active properties of the products according to the invention vary more or less in relation to the thick oils or the conversion products or fractions derived therefrom (the properties of which are in turn dependent on the alkenes used for the formylation process) which are subjected to the sulfation. Thus, for instance, the sulfation products obtained from thick oils which have been derived from the formylation of alkenes with relatively low molecular weight, such as the $C_5$ or $C_6$ alkenes, are found to have excellent wetting properties, while those obtained from thick oils which have been derived from the formylation of higher alkenes containing, for example, 8 to 9 carbon atoms, are more specially characterized by satisfactory emulsifying and cleansing properties.

The products according to the invention are valuable for all applications in which good surface-active properties are essential. Whether or not combined with other substances, such as inorganic salts, organic solvents or substances which themselves have surface-active properties, the above products may, for instance, be used advantageously as wetting and dispersing agents, for example, in the textile, leather and paper industries or as detergents and cleaning agents for textiles and other material. Some of these products may also be conveniently applied for splitting water-in-oil emulsions.

The following examples illustrate in more detail suitable methods of carrying out the new process and show some of the advantages of the novel products which are produced.

*Example I*

As initial material, use was made of a thick oil obtained in the preparation of $C_7$-alcohols from 1-hexene by oxo-synthesis carried out as follows:

One hundred parts by weight of 1-hexene were treated in the presence of 3 parts by weight of a cobalt catalyst on kieselguhr (containing 30% of cobalt) with water gas in an autoclave under a pressure of 100 atm. and a temperature of 140° C., until there was no longer any reduction of pressure, which happened after 10 hours.

Upon cooling and discharging the residual water gas, the reaction mixture was stirred for two hours at 150° C. and under a hydrogen pressure of 100 atm. After cooling, reducing the pressure and rinsing with hydrogen, the contents of the autoclave, in the presence of the catalyst still present in the reaction mixture, were hydrogenated at 185° C. under a hydrogen pressure of 100 atm., until the pressure remained constant.

After the catalyst had been removed by filtration, the resultant reaction product (113 parts by weight) was distilled, during which process a first running (mainly unreacted hexene) and at temperatures between 120° C. and 180° C. the oxo-alcohols formed, totaling 84 parts by weight, distilled over and 27.5 parts by weight of thick oil remained as residue.

The resultant thick oil, which had a saponification number=102, an acetyl saponification number=273 and an acid number=1.5, was then sulfated by gradually adding, while stirring, 103 parts by weight of chlorosulfonic acid to a solution of 100 parts by weight of the thick oil in approximately 71 parts by weight of ether, the temperature being maintained at 10° C.–15° C. by cooling, after which the stirring was continued for some time. The ether and hydrochloric acid formed were subsequently removed in vacuo by suction and the reaction product was then poured into a mixture of 200 parts by weight of ice and 67 parts by weight of a NaOH solution of 35% concentration. After further alkali had been added until the reaction was exactly neutral on phenol phthalein, the resultant sulfation product was extracted twice with ether, and from the thus-obtained ethereal solution of the desired sulfation product, after having been dried with sodium sulfate, the ether was evaporated in vacuo. The residual sulfation product amounting to approximately 153 parts by weight had a content of active substance of 57.3%, calculated on $C_{14}H_{29}SO_4Na$.

On testing with the aid of the well-known Draves test, the resulting product was found to have a particularly good wetting action. In fact, the Draves concentration—which indicates the percentage of active substance that must be present in the solution to cause an immersed skein of raw cotton of a definite weight to sink in a certain period of time—in this case amounted to 0.020%. For the sake of comparison, it must be remarked that the product known by the name of Aerosol OT, which consists of the sodium salt of sulfo succinic dioctyl ester and is an excellent wetting agent, was found to have a Draves concentration of 0.022%.

*Example II*

The same thick oil, as referred to in Example I, was subjected to a destructive hydrogenation at 280° C. and under a hydrogen pressure of 280 atm., in the presence of 5% of a copper chromite-barium catalyst. After removing the catalyst by filtration the formed monomeric alcohol, in a quantity of approximately 32% of the thick oil, was distilled from the resultant reaction product at a pressure of 15 mm. mercury and a temperature up to 90° C. The residue, the weight of which amounted to approximately 57% of the thick oil, had a saponification number of 13, an acetyl saponification number of 192 and an acid number of 1.3. This residue was then sulfated in the same manner and further treated as referred to in Example I, as a result of which 134 parts by weight of sulfation product were obtained from 75 parts by weight of the residue; this sulfation product had a content of 40.1% of active substance calculated on $C_{14}H_{29}SO_4Na$.

The product obtained had good wetting properties. When the wetting action was determined according to the Draves test, the Draves concentration was found to be 0.040%.

Example III

A fraction with a boiling range of 141° C.–152° C. was separated by vacuum distillation (12 mm. mercury pressure) from the hydrogenation product referred to in Example II, in a quantity of 59% calculated on the product in question. This fraction, which largely consisted of $C_{14}$-alcohols, was then sulfated in the manner of Example I. Starting from 50 parts by weight of the separated fraction, 68 parts by weight of sulfation product were obtained with a content of 80% active substance calculated on $$C_{14}H_{29}SO_4Na$$

The product obtained had a Draves concentration of 0.031%.

Example IV

The thick oil of Example III reacted as described therein with phosphoric acid of 100% concentration at about 75° C., instead of being sulfated, gives a sodium organic phosphate mixture ($C_{14}H_{29}PO_4Na_2$) of similar appearance and good wetting and emulsifying properties.

Example V

As starting material a thick oil was used, obtained from the formylation of n-octene which was carried out in a manner similar to that of hexene referred to in Example I. The sulfation of this thick oil according to the method described in Example I yielded a product with satisfactory emulsifying properties. Thus, by dissolving 8% to 10% of this product in spindle oil and pouring the solution into soft water a very stable emulsion was obtained, while the use of hard water (50° German hardness) resulted in a good emulsion which showed no flocculation.

Example VI

The thick oil of Example V was subjected to destructive hydrogenation in a manner similar to that described in Example I, and from the product obtained a fraction largely consisting of $C_{18}$-alcohols was separated by vacuum distillation (0.2 mm. mercury pressure) between 138° C. and 148° C., which fraction was then sulfated and worked up according to the method described in Example I.

The resultant sulfation product had an excellent washing action, as was proved by washing experiments on cotton, and good emulsifying properties as well.

Example VII

One hundred parts by weight of thick oil originating from the formylation of a $C_6$–$C_8$ vapor phase cracking distillate according to the continuous process were treated for 15 minutes at 40° C. with 100 parts by volume of sulfuric acid of 96% concentration, and then the reaction mixture was poured into water. This resulted in the formation of two layers, of which the non-aqueous phase was taken up in alcohol of 50% concentration. The alcoholic solution was then neutralized with caustic soda lye and extracted with pentane to remove the non-converted components. Upon evaporation of the alcoholic solution, 111 parts by weight of an unctuous reaction product with a content of 70.6% of active substance and a Draves concentration of 0.073% were obtained.

It will thus be seen that the invention offers many advantages over prior methods of producing surface-active compounds, particularly in providing a way for converting an undesirable by-product into novel compounds having desirable properties. It will also be apparent that the invention is not limited to the examples given by way of illustration nor to the details of operation disclosed. For example, the thick oil may be subjected to a saponification treatment to convert the esters therein to corresponding alcohols and diols which may be reacted with sulfuric or phosphoric acid or the like in accordance with the invention and the salts of the carboxylic acids formed recovered as valuable by-products of the process. Also, the thick oil may be closely fractionated or otherwise separated to obtain products predominating in diols, or in the corresponding monohydroxy primary alcohols, or in carboxylic acid esters of diols, and these may be separately reacted with an oxy-acid of phosphorus or sulfur and converted to surface-active salts particularly adapted to special uses. Still other variations in the process may be made without departing from the invention which will be understood as not dependent upon any theory advanced in explanation of the advantageous results which are obtained.

We claim as our invention:

1. In a process of producing surface-active salts from the products of oxo-synthesis with olefins of 6 to 9 carbon atoms wherein the oxo-synthesis products are separated to remove higher boiling products from the oxo-alcohols of $n+1$ carbon atoms where $n$ represents the number of carbon atoms per molecule in the starting olefin, the improvement which comprises reacting at least a part of said separated higher boiling products consisting substantially of esters and diols having from 2 to 4 times the number of carbon atoms per molecule present in the oxo-alcohol with an inorganic acid of the group consisting of the oxy-acids of phosphorus and sulfur to produce acid esters of said acid, and neutralizing said acid esters with a basic compound.

2. A process in accordance with claim 1 in which the separated mixture of esters and diols having 2 to 4 times as many carbon atoms as said oxo-alcohols is esterified with concentrated sulfuric acid.

3. A process in accordance with claim 2 in which the acid sulfate esters of the diols produced are converted to alkali metal salts.

4. A process in accordance with claim 1 in which the separated mixture of esters and diols having 2 to 4 times as many carbon atoms as said oxo-alcohols is esterified with phosphoric acid.

5. In a process of producing surface-active salts from the products of oxo-synthesis with olefins of 6 to 9 carbon atoms wherein the oxo-synthesis products are separated to remove higher boiling products from the oxo-alcohols of $n+1$ carbon atoms where $n$ represents the number of carbon atoms per molecule in the starting olefin, the improvement which comprises reacting at least a part of said separated higher boiling products consisting substantially of esters and diols having from 2 to 4 times the number of carbon atoms per molecule present in the oxo-alcohol with hydrogen in the presence of a hydrogenation catalyst at 200° C. to 300° C. and 200 to 300 atmospheres pressure to selectively hydrogenate the esters, esterifying the diols remaining in the product by reaction with an inorganic acid of the group consisting of the oxy-acids of phosphorus and sulfur to produce acid esters of said acid, and neutralizing said esters with a basic compound.

6. A process in accordance with claim 5 in which said diols are converted to acid sulfate esters which are neutralized with sodium hydroxide.

7. A process in accordance with claim 5 in which said diols are converted to acid phosphate esters.

THOMAS H. VAN BAVEL.
HAN HOOG.
PIETER W. O. WIJGA.

REFERENCES CITED

The following references are of record in the file of this patent:

UNITED STATES PATENTS

| Number | Name | Date |
|---|---|---|
| 2,200,216 | Loewenberg | May 7, 1940 |
| 2,227,659 | Luther | Jan. 7, 1941 |
| 2,321,020 | Dreger | June 8, 1943 |
| 2,327,066 | Roelen | Aug. 17, 1943 |
| 2,341,218 | James | Feb. 8, 1944 |
| 2,437,600 | Gresham et al. | Mar. 9, 1948 |

OTHER REFERENCES

F. I. A. T. Report No. 1000, released Dec. 26, 1947, pages 29, 30, 35 and 36.

Ser. No. 369,507, Roelen (A. P. C.), published July 13, 1943.